US012757947B1

(12) United States Patent
Rangan et al.

(10) Patent No.: US 12,757,947 B1
(45) Date of Patent: Oct. 13, 2026

(54) WEARABLE DEVICE FOR ITEM TRANSPORTATION ALERTS

(71) Applicant: Amazon Technologies, Inc., Seattle, WA (US)

(72) Inventors: Suresh Rangan, Frisco, TX (US); Sean Lins Healy, Santa Rosa Beach, FL (US); Eli Ivan Pabon, Cibolo, TX (US); Nicholas Sedrick Slaven, Lafayette, TN (US)

(73) Assignee: Amazon Technologies, Inc., Seattle, WA (US)

( * ) Notice: Subject to any disclaimer, the term of this patent is extended or adjusted under 35 U.S.C. 154(b) by 30 days.

(21) Appl. No.: 18/806,335

(22) Filed: Aug. 15, 2024

(51) Int. Cl.

| | |
|---|---|
| ***A41D 1/00*** | (2018.01) |
| *F21V 23/00* | (2015.01) |
| *F21V 23/04* | (2006.01) |
| *F21V 33/00* | (2006.01) |
| *G08B 3/00* | (2006.01) |

(52) U.S. Cl.
CPC .......... *A41D 1/002* (2013.01); *A41D 2300/00* (2013.01); *F21V 23/007* (2013.01); *F21V 23/0471* (2013.01); *F21V 33/0008* (2013.01); *G08B 3/00* (2013.01)

(58) Field of Classification Search
CPC .. A41D 1/002; A41D 2300/00; F21V 23/007; F21V 23/0471; F21V 33/0008; G08B 3/00
USPC ........................................................ 340/407.1
See application file for complete search history.

(56) References Cited

U.S. PATENT DOCUMENTS

| | | | | |
|---|---|---|---|---|
| 5,070,436 A * | 12/1991 | Alexander | G08B 5/004 362/108 |
| 8,408,731 B1 * | 4/2013 | Joyner | A41D 1/04 362/108 |
| 8,616,719 B1 * | 12/2013 | Barze | A41D 13/01 362/108 |
| 11,727,374 B1 * | 8/2023 | Walker | G06Q 20/18 235/379 |
| 11,852,311 B2 * | 12/2023 | Bertken | F21L 4/02 |
| 12,354,455 B1 * | 7/2025 | Warnick | G08B 21/02 |
| 2008/0043458 A1 * | 2/2008 | Desjardin | G08B 5/004 362/108 |

(Continued)

OTHER PUBLICATIONS

Zeagler, "Where to Wear It: Functional, Technical, and Social Considerations in On-Body Location for Wearable Technology 20 Years of Designing for Wearability," *ISWC* '17, Sep. 2017, Maui, HI, Available Online at: https://doi.org/10.1145/3123021.3123042, May 9, 2023, 8 pages.

*Primary Examiner* — Brian A Zimmerman
*Assistant Examiner* — Thang D Tran
(74) *Attorney, Agent, or Firm* — Kilpatrick Townsend & Stockton LLP

(57) ABSTRACT

Techniques for a wearable garment for item transportation alerts are described herein. In an example, a system includes a wearable garment configured to generate data associated with item transportation. The wearable garment includes an output interface. The output interface includes at least one of a light source or an alarm device. The system includes a user device configured to execute an item transportation application. Upon execution of the item transportation application the user device is configured to: receive the data from the wearable garment and cause an action associated with the output interface of the wearable garment.

20 Claims, 9 Drawing Sheets

(56) References Cited

U.S. PATENT DOCUMENTS

| | | | | |
|---|---|---|---|---|
| 2010/0167608 | A1* | 7/2010 | Daye | B63C 9/1255 441/89 |
| 2010/0289662 | A1* | 11/2010 | Dasilva | G01V 15/00 340/686.6 |
| 2011/0197742 | A1* | 8/2011 | Liotta | H04R 1/1033 84/730 |
| 2011/0235311 | A1* | 9/2011 | Stone | A41D 13/01 362/106 |
| 2014/0015444 | A1* | 1/2014 | Saito | H05B 47/11 315/297 |
| 2014/0022766 | A1* | 1/2014 | Wright | G08B 5/004 362/108 |
| 2016/0073706 | A1* | 3/2016 | Hartnett | H05B 47/105 315/297 |
| 2017/0322761 | A1* | 11/2017 | Marcus | G06F 3/1438 |
| 2018/0014512 | A1* | 1/2018 | Arabani | A01K 29/005 |
| 2018/0255847 | A1* | 9/2018 | Gueritee | A41D 19/01535 |
| 2019/0037166 | A1* | 1/2019 | Davis | G11B 33/025 |
| 2019/0104777 | A1* | 4/2019 | Lauf | G08B 5/004 |
| 2019/0364983 | A1* | 12/2019 | Nakajima | A41H 3/06 |
| 2020/0157713 | A1* | 5/2020 | Nakajima | H01B 13/008 |
| 2020/0288675 | A1* | 9/2020 | Auld | A01K 27/002 |
| 2020/0352476 | A1* | 11/2020 | Ladd | G06F 3/14 |
| 2020/0367332 | A1* | 11/2020 | Pearson | B64D 11/00 |
| 2021/0048158 | A1* | 2/2021 | Cai | F21V 23/0471 |
| 2021/0062983 | A1* | 3/2021 | Dong | F21V 23/06 |
| 2021/0299297 | A1* | 9/2021 | Roeder, Jr. | F21V 21/084 |
| 2021/0362463 | A1* | 11/2021 | Abbott | G01D 21/00 |
| 2022/0238129 | A1* | 7/2022 | Angkititrakul | H04R 1/028 |
| 2022/0241443 | A1* | 8/2022 | Krzeminski | A61L 2/10 |
| 2023/0095529 | A1* | 3/2023 | Akutsu | G07C 9/00563 340/5.83 |
| 2023/0232928 | A1* | 7/2023 | Hau | A42B 1/242 362/106 |
| 2023/0240521 | A1* | 8/2023 | Onobori | A61B 1/06 600/181 |
| 2023/0254642 | A1* | 8/2023 | Smith | H04R 1/028 348/143 |
| 2023/0306497 | A1* | 9/2023 | Lert | G06Q 30/06 |
| 2024/0005263 | A1* | 1/2024 | Choi | G06V 20/36 |
| 2024/0100215 | A1* | 3/2024 | Smithson | A61L 9/20 |
| 2024/0245148 | A1* | 7/2024 | Singer | A41D 13/0051 |
| 2024/0391375 | A1* | 11/2024 | Colucci | B60P 1/649 |

* cited by examiner

WEARABLE DEVICE FOR ITEM TRANSPORTATION ALERTS

BACKGROUND

More and more users and entities are turning to online services for day-to-day activities. Many of the services span both the digital world and the physical world. For example, a user may operate a computing device to order an item from a web site. The item may be delivered from a storage facility to a delivery location of the user. Different computing services are available to improve the driver experience with item deliveries.

BRIEF DESCRIPTION OF THE DRAWINGS

Various embodiments in accordance with the present disclosure will be described with reference to the drawings, in which.

DETAILED DESCRIPTION

Figure 1:
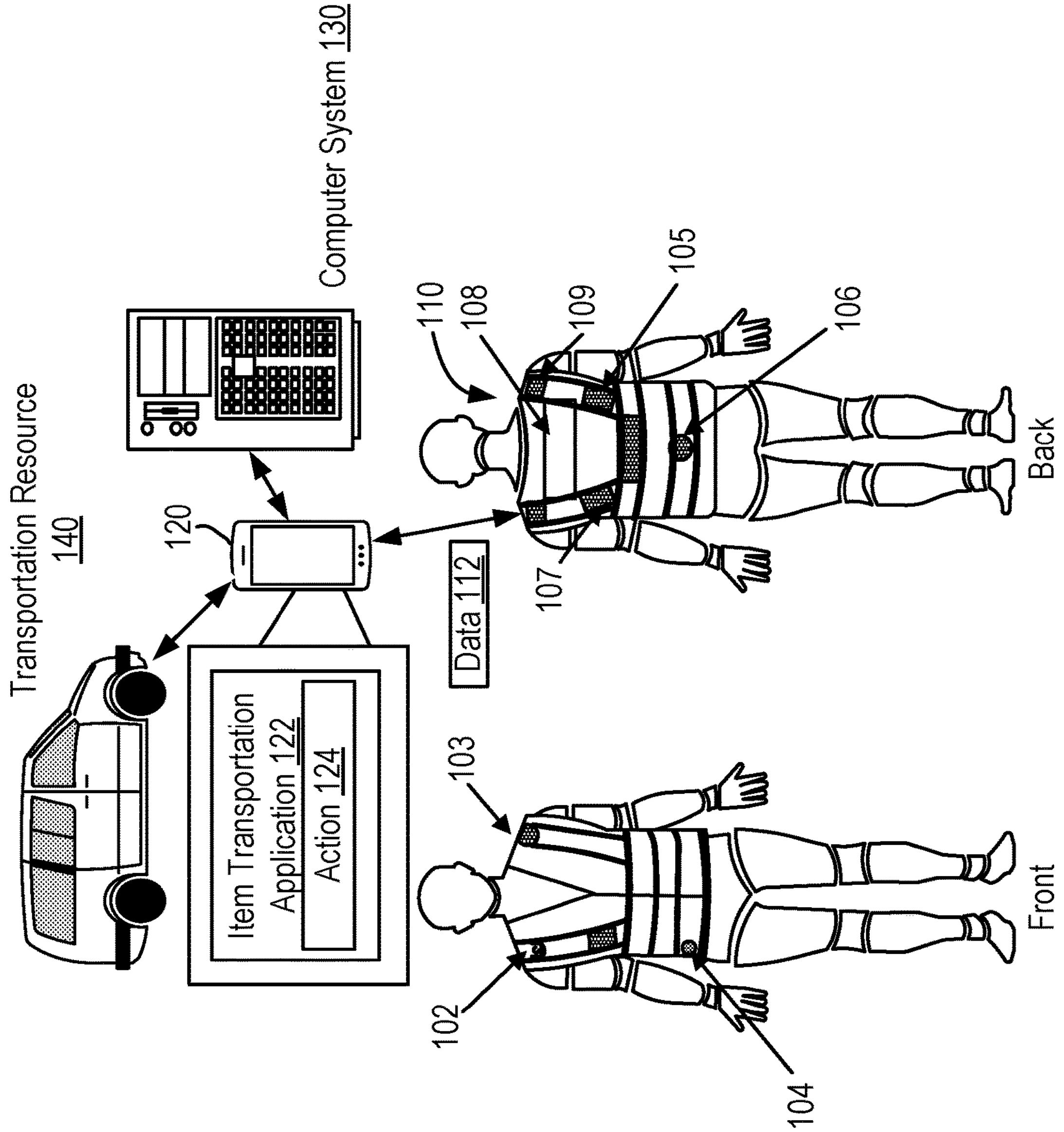
FIG. 1 illustrates an example of an overall context of item transportation alerts using a wearable device according to some embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a wearable device for item transmission alerts. The wearable device can provide alerts relative to potential threats or related to environmental awareness for a user that is wearing the wearable device. In an example, a system includes a wearable device configured to generate data associated with item transportation. The wearable device includes various sensors (e.g., accelerometers, proximity sensors, cameras, microphones, temperature sensors, etc.) that generate the data. The wearable device includes an output interface of at least one of a light source or an alarm device. The system can include a user device that executes an item transportation application that receives the data from the wearable device and causes an action associated with the output interface of the wearable device. For instance, the user device may cause an activation of the light source or the alarm device based on the data indicating a risk to the user.

To illustrate, consider an example of a delivery driver delivering items along a route. The delivery driver can wear a vest integrated with sensors including a proximity sensor and a temperature sensor and processing circuitry that is communicatively coupled with a mobile device of the delivery driver. The vest also includes a light source and an alarm device. As the delivery driver performs an item transportation, the proximity sensor sends proximity data to the processing circuitry, which controls operation of the light source based on the proximity data. For instance, when the delivery driver is inside a delivery vehicle, the proximity data indicates the presence of a surface relative to the proximity sensor. So, the light source is turned off. When the delivery driver exits the delivery vehicle, the proximity data no longer indicates the presence of the surface relative to the proximity sensor, so the light source is turned on to provide visibility to the delivery driver. In addition, the temperature sensor generates temperature data that is sent to the mobile device. An item transportation application of the mobile device receives the temperature data and determines that the temperature of the environment of the delivery driver is above ninety degrees. As a result, the mobile device can determine that a notification should be provided and cause the alarm device to output an audible alert to the driver.

Embodiments of the present disclosure may provide technical improvements over conventional techniques for wearable devices. Conventional techniques may involve passive lighting that reflect ambient light to provide visibility of a wearer. However, conventional techniques lack additional lighting for providing visibility to a wearer and alarms or other devices for alerting a wearer to potential risks. Embodiments of the present disclosure provides sensor based adaptive technology in a wearable device that uses connected data to safely mitigate safety risks in real time (e.g., within a few milliseconds, a few seconds, or a few minutes of data generation due to processing latency). The wearable device can provide alerts related to unforeseen risks such as hazards in driveways, slips, trips and falls, strains, potentially aggressive animals, exposure to excessive heat or cold, extreme weather, and operations in the dark. As such, the overall experience of the wearer is improved.

Illustrative examples for a wearable device are provided in relation to a vest such as a smart vest for simplicity. The wearable device may also be referred to as a wearable garment. Embodiments are not limited to vests and other wearable garments are possible. For instance, the wearable device may be any wearable clothing item or accessory like a belt, side sash, thigh wrap, hat, apron, pants, shorts, shirts, ponchos, shells, sleeves, etc. In addition, while examples are provided with respect to a wearable device for delivery drivers, embodiments are not limited as such. The wearable device may be worn for other operations to provide appropriate alerts.

FIG. 1 illustrates an example of an overall context of item transportation alerts using a wearable device according to some embodiments of the present disclosure. A driver may be performing item transportation to delivery items to one or more delivery locations. The driver may wear a wearable device 110 with various sensors and output interfaces during the item transportation. The wearable device 110 can be communicatively coupled to a user device 120 of the delivery driver, which can execute an item transportation application 122 and determine actions that are to be performed based on data 112 received from the sensors. In addition, the user device 120 may additionally communicate with a computer system 130 or a transportation resource 140 (e.g., vehicle of the delivery driver) to receive additional data or to further analyze the data 112.

In an example, the wearable device 110 includes a front portion that is worn over a front of a body of the delivery driver and a back portion that is worn over a back of a body of the delivery driver. As such, the wearable device 110 may be a vest with two sides to the front portion (e.g., a first shoulder portion and a second shoulder portion) that are worn over different shoulders of the delivery driver. The sensors of the wearable device 110 can collect data 112 during the item transportation. For instance, the sensors can include temperature sensors 107, accelerometers 109, Global Positioning System (GPS) sensors, proximity sensors, cameras, photosensors 105, sound sensors, microphones, etc. the wearable device 110 may also include at least one attention light source 108 that reflects ambient light and optionally includes light emitting diodes (LEDs) to make the delivery driver visible to other people. In some instances, the wearable device 110 includes an attention light source on the front portion and on the back portion to provide visibility from both directions.

The data 112 is sent to the user device 120, which executes the item transportation application 122 to process the data 112. The user device 120 may also send the data 112 or a portion of the data to the computer system 130 for further processing. Based on the execution of the item transportation application 122, the user device 120 can determine an action 124 that is to be performed. The action 124 can be an output that is to be initiated by an output interface of the wearable device 110. For example, the wearable device 110 can include output interfaces of light sources 102, alarm devices 104, ultrasonic devices 106, speakers 103, etc. So, the user device 120 may send an indication of the action 124 that is to be performed to the wearable device 110, which can cause the action 124 using the appropriate output interface. As an example, the data 112 may be accelerometer data that indicates that the delivery driver has performed repetitive movements with an incorrect posture, which can lead to musculoskeletal strain or injury. So, the item transportation application 122 determines that an audio output is to be output by the speaker 103 that provides instructions about how to perform the movements correctly. The user device 120 can communicate with the wearable device 110 to cause the audio output to be output by the speaker 103.

Figure 2:
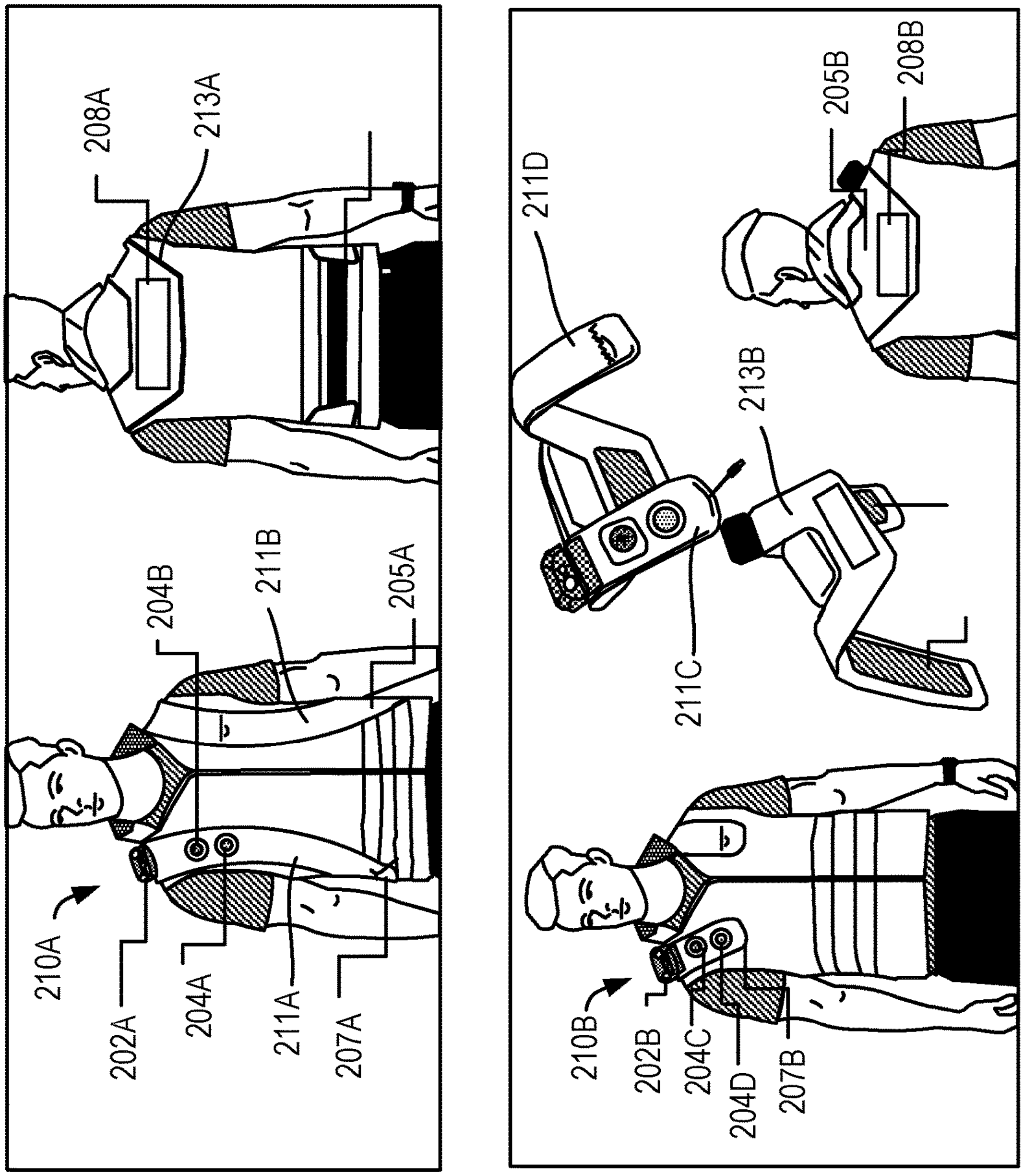
FIG. 2 illustrates example configurations for a wearable device according to some embodiments of the present disclosure.

FIG. 2 illustrates example configurations for a wearable device according to some embodiments of the present disclosure. Wearable devices 210A-210B are examples of the wearable device 110 in FIG. 1. The wearable device 210A includes shoulder portions 211A-211B that are disposed around a front of a body of a delivery driver. The wearable device 210A also includes a back portion 213A that is disposed around a back of the body. The shoulder portions 211A-211B and the back portion 213A may be secured around the body using an elastic strap. Other example fasteners may include stitching, Velcro, magnets, pins, etc. The shoulder portion 211A includes a light source 202A, alarm devices 204A-204B, and a wire extender 207A. The wire extender 207A can be connected to a battery pack 205A that is disposed in the shoulder portion 211B. The wire extender 207A provides a charging cable for charging the battery pack 205A, or can be used to charge another device using the battery pack 205A. Although not shown in FIG. 2, the shoulder portion 211A may also include a proximity sensor in proximity to the light source 202A that detects when a surface is present relative to the light source 202A. When a surface is detected, the light source 202A may be turned off. The back portion 213A includes an attention light source 208A that reflects ambient light. In some instances, the battery pack 205A may also be disposed in the back portion 213A.

In an example, the wearable device 210B includes shoulder portions 211C-211D that are disposed around a front of a body of a delivery driver. The wearable device 210B also includes a back portion 213B that is disposed around a back of the body. The shoulder portions 211C-211D and the back portion 213B may be secured to the body using a hook-and-loop fastener, stitching, magnets, pins, etc. that attach to another wearable item (e.g., a vest). The shoulder portion 211C includes a light source 202B, alarm devices 204C-204D, and a wire extender 207B. Similar to wearable device 210A, the shoulder portion 211C may also include a proximity sensor in proximity to the light source 202B that detects when a surface is present relative to the light source 202B. When a surface is detected, the light source 202B may be turned off. The back portion 213B includes an attention light source 208B that reflects ambient light. A battery pack 205B is also disposed in the back portion 213B.

In an example, the light sources 202A-202B and the alarm devices 202A-202D may be triggered manually or based on a determination of a user device (e.g., user device 120 in FIG. 1). Data from sensors that are not illustrated in FIG. 2 may be analyzed by the user device to determine whether and how the light sources 202A-202B and/or the alarm devices 202A-202D are to be triggered. For instance, the wearable device 210A can include an accelerometer that is used to measure speed data of the delivery driver during an item transportation. The speed data is sent to the user device, which executes an item transportation application and determines that based on the speed data, the wearable device 210A is moving with a transportation resource (e.g., a vehicle). In other words, the delivery driver is in a vehicle and not walking to a delivery location. So, the user device can determine that the light source 202A is to be disabled so as to not distract the delivery driver while driving. The user device sends an indication to the wearable device 210A indicating that the light source 202A is to be disabled and the wearable device 210A disables the light source 202A from outputting light.

Although not shown in FIG. 2, the wearable devices 210A-210B can also include processing circuitry disposed in the shoulder portions 211A and 211C. The processing circuitry can be communicatively coupled to the light sources 202A-202B and the proximity sensors to control the light sources 202A-202B. In addition, the processing circuitry can receive the indications of the actions from the user device and cause the action to be performed using the light sources 202A-202B and/or the alarm devices 204A-204D.

In an example, since the vest or wearable item of the delivery driver may need to be washed frequently, a wearable device with the battery, processing circuitry, and optionally the sensor modules and output interfaces can be disposed in a removable sleeve of the wearable item. The removable sleeve with the components of the wearable device is removably coupled to the wearable item. For example, the wearable item may include a zipper portion through which the removable sleeve may be inserted and removed. Once removed, the wearable item can be washed, and then the removable sleeve can be reinserted into the wearable item.

Figure 3:
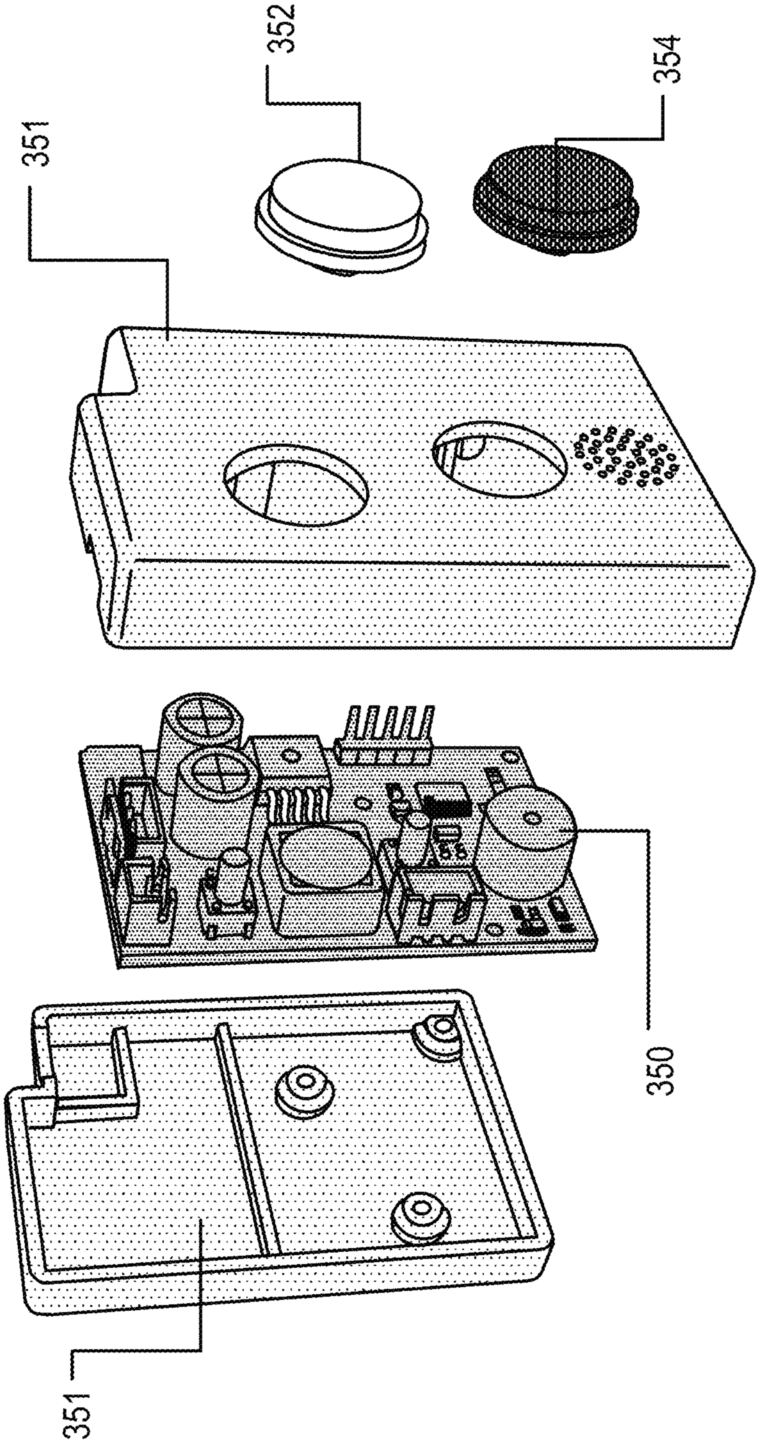
FIG. 3 illustrates an example of a housing for processing circuitry for a wearable device according to some embodiments of the present disclosure.

FIG. 3 illustrates an example of a housing 351 for processing circuitry 350 for a wearable device according to some embodiments of the present disclosure. The housing 351 includes a first side and a second side that attach together. The processing circuitry 350 is disposed within the housing 351 between the first side and the second side.

In an example, the housing 351 includes openings for a light button 352 and an alarm button 354. The light button 352 and the alarm button 354 are communicatively coupled to the processing circuitry 350. Upon receiving a user input of a push of the light button 352, the processing circuitry 350 can cause a light source communicatively coupled to the processing circuitry 350 and associated with the light button 352 to be turned on or off. In addition, upon receiving a user input of a push of the alarm button 354, the processing circuitry 350 can cause an alarm device communicatively coupled to the processing circuitry 350 and associated with the alarm button 354 to be activated or deactivated. For instance, the alarm device may be a buzzer that is caused to output an alert. Or, the alarm device may be a speaker or an ultrasonic device that is caused to output a speech or other auditory alert (e.g., ultrasonic sound waves).

Figure 4:
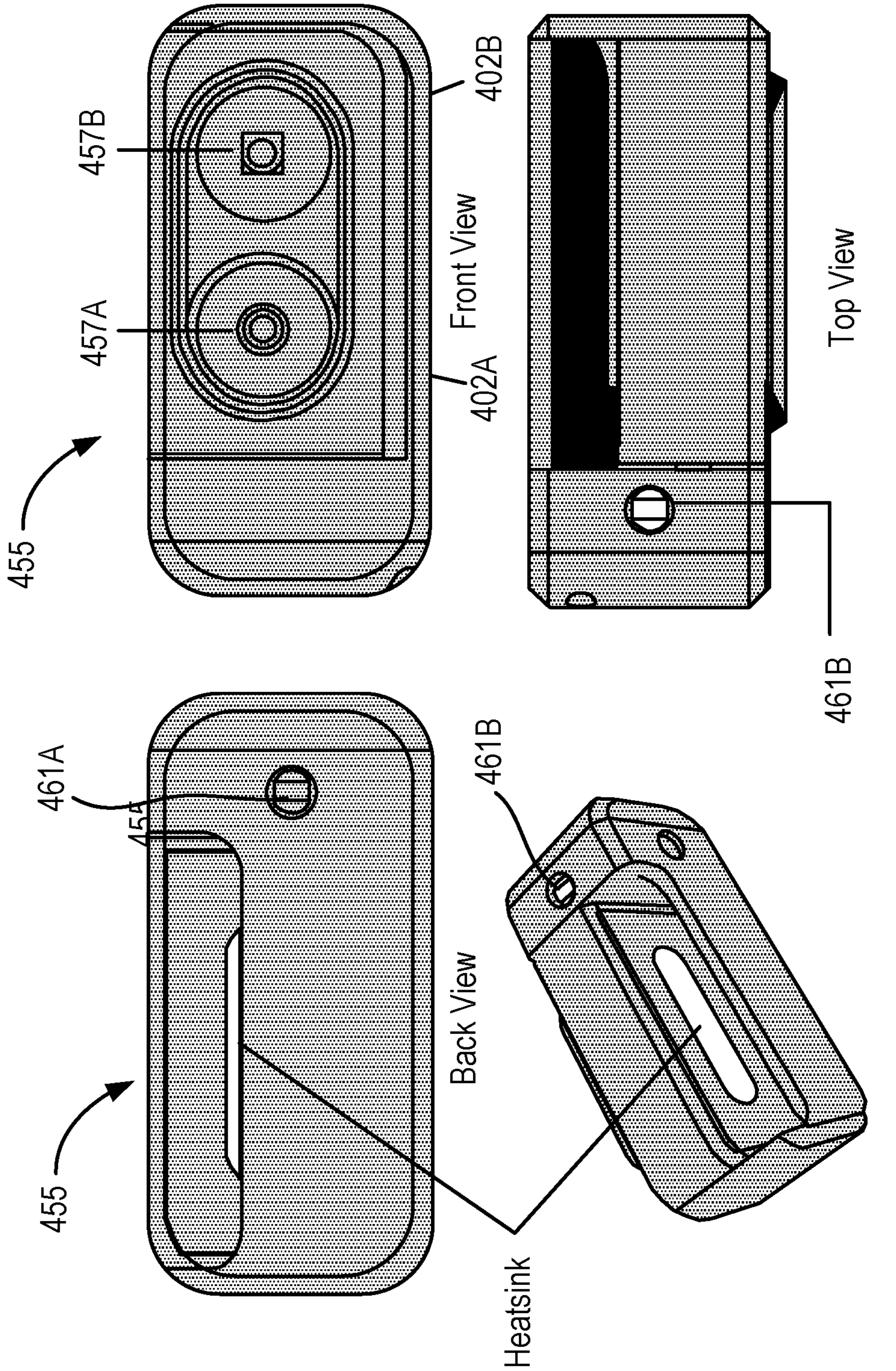
FIG. 4 illustrates an example of a housing for light sources for a wearable device according to some embodiments of the present disclosure.

FIG. 4 illustrates an example of a housing 455 for light sources 402A-402B for a wearable device according to some embodiments of the present disclosure. The housing 455 can be positioned on a shoulder portion of a vest. The housing 455 includes a first side (e.g., a front side) and a second side (e.g., a back side) that attach together. Processing circuitry for the light sources 402A-402B is disposed within the housing 455 between the first side and the second side.

In an example, the housing 455 includes an opening for lenses 457A-457B associated with the light sources 402A-402B. That is, lens 457A can be associated with light source 402A and lens 457B can be associated with light source 402B. The lens 457A may cause the light source 402A to output first light at a first range (e.g., fifteen degrees) from the delivery driver and the lens 457B may cause the light source 402B to output second light at a second range (e.g., five degrees) from the delivery driver. So, the light source 402A may provide a longer range of visibility (e.g., ten feet) than the light source 402B (e.g., one foot). In some instances, the housing 455 can also include a hinge that can be used to adjust an angle of the first light and the second light. The hinge may be attached to the shoulder portion of the vest and may be adjustable by a ratchet mechanism. In addition, the housing 455 may include a canopy disposed in the opening for the lenses 457A-457B to block a portion of the first light and the second light from a face of the delivery driver. The canopy may block the light from the side and/or from the top.

In an example, the housing 455 also includes proximity sensors 461A-461B. The proximity sensors 461A-461B can be communicatively coupled with the light sources 402A-402B. The proximity sensor 461A detects a presence of a surface or an object in a first direction, and the proximity sensor 461B detects a presence of a surface or an object in a second direction. For instance, the proximity sensor 461A may be positioned on a back side of the housing 455 to detect a presence of a surface behind the housing 455 and the proximity sensor 461B may be positioned on a top side of the housing 455 to detect a presence of a surface above the housing 455. When a surface is detected by at least one of the proximity sensors 461A-461B, the light sources 402A-402B can be disabled from outputting light.

Figure 5:
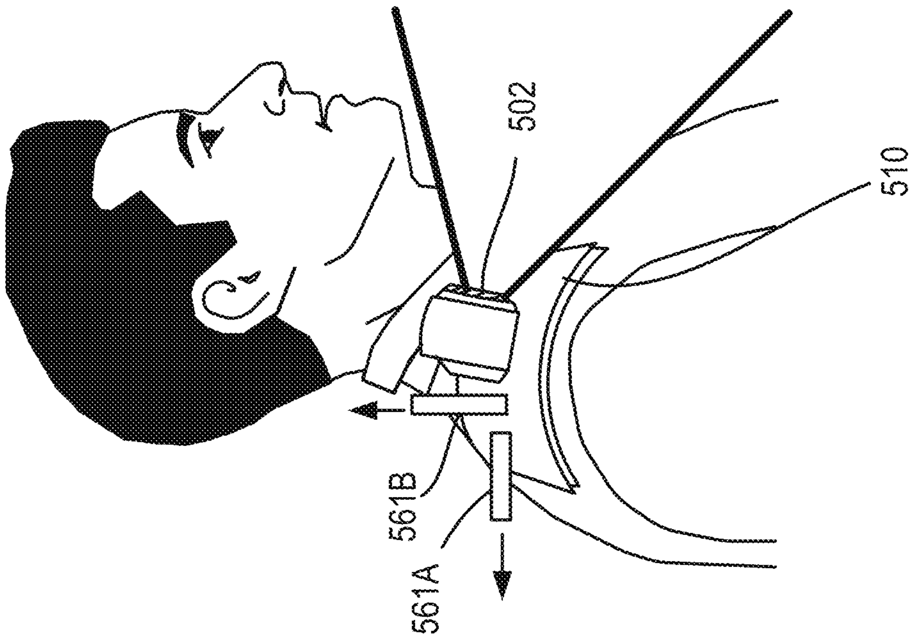
FIG. 5 illustrates an example of proximity sensors for a wearable device according to some embodiments of the present disclosure.

FIG. 5 illustrates an example of proximity sensors 561A-561B for a wearable device 510 according to some embodiments of the present disclosure. The proximity sensors 561A-561B can be communicatively coupled with a light source 502, or multiple light sources. In addition, the proximity sensors 561A-561B can be communicatively coupled with processing circuitry which can control the operation of the light source 502 based on data received from the proximity sensors 561A-561B.

In an example, the proximity sensor 561A detects a presence of a surface or an object in a first direction relative to a delivery driver, and the proximity sensor 561B detects a presence of a surface or an object in a second direction relative to a delivery driver. For instance, the proximity sensor 561A may be positioned to detect a presence of a surface behind the delivery driver and the proximity sensor 561B may be positioned to detect a presence of a surface above the delivery driver. As such, when the delivery driver sits in a delivery vehicle, the proximity sensor 561A can detect the presence of a surface of a headrest and the proximity sensor 561B can detect the presence of a surface of a ceiling. Based on one or more of these detections, the processing circuitry can cause the light source 502 to be disabled from outputting light.

In an example, one or more of the proximity sensors 561A-561B may be a photosensor. For example, the proximity sensor 561B may be a photosensor that is communicatively coupled to the light source 502 via the processing circuitry. The photosensor may detect a change in a presence of light above the delivery driver. In response, the processing circuitry may cause the light source 502 to be turned on or off. For instance, the delivery driver waving a hand above the photosensor can result in the light source 502 being turned on or off.

Figure 6:
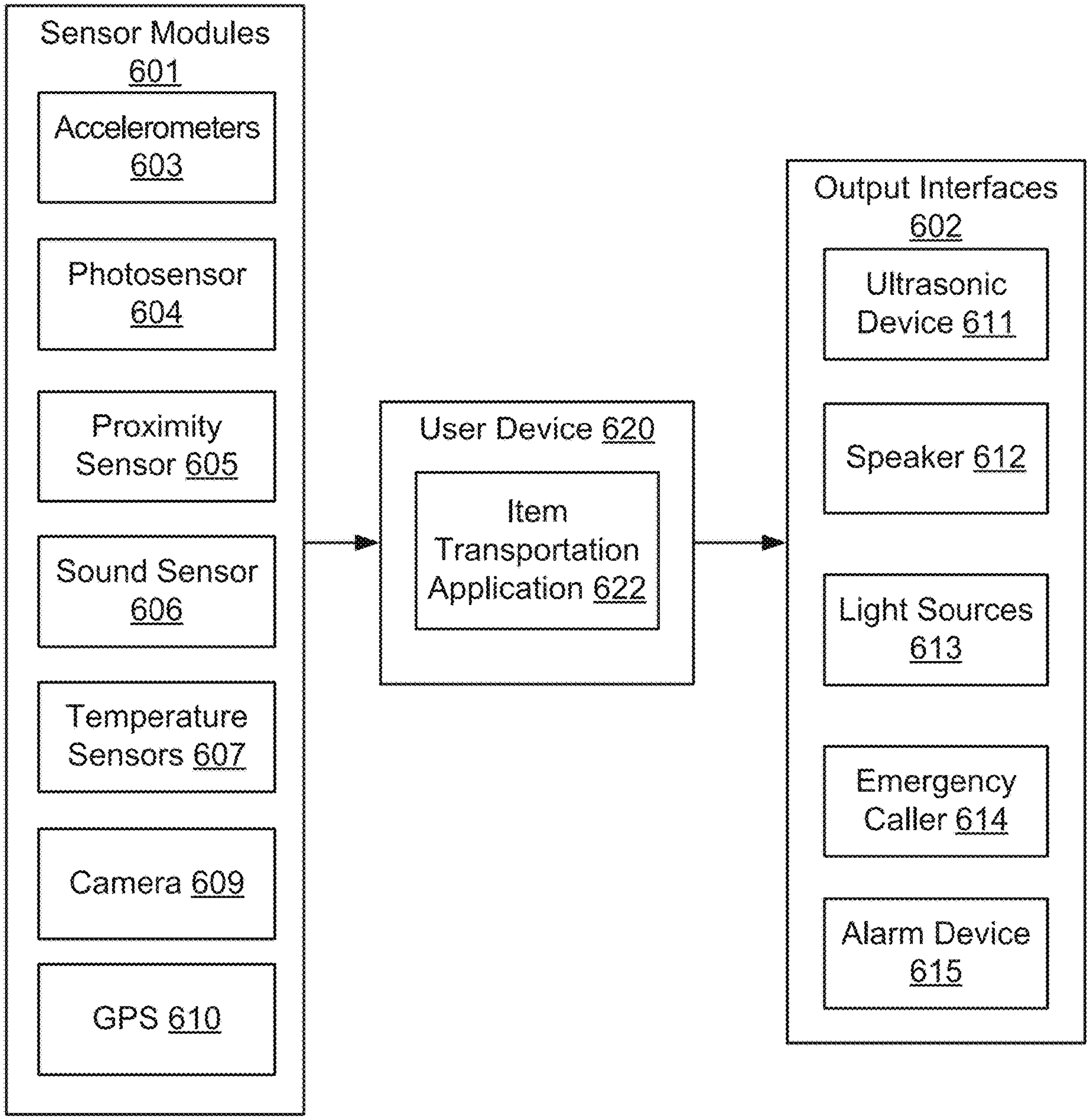
FIG. 6 illustrates an example of sensor modules and output interfaces for a wearable device according to some embodiments of the present disclosure.

FIG. 6 illustrates an example of sensor modules 601 and output interfaces 602 for a wearable device according to some embodiments of the present disclosure. The sensor modules 601 and the output interfaces 602 may be part of wearable device 110 in FIG. 1. A user device 620 can be in communication with the sensor modules 601 and the output interfaces 602 via Bluetooth or Wi-Fi.

In an example, the sensor modules 601 include accelerometers 603, a photosensor 604, a proximity sensor 605, a sound sensor 606, temperature sensors 607, a camera 609, and a GPS 610. During item transportation, one or more of the sensor modules 601 can generate data that is sent to the user device 620, where an item transportation application 622 is executed. Upon execution of the item transport application 622, the user device 620 determines an action that is to be performed by one or more of the output interfaces 602 of the wearable device. The output interfaces 602 include an ultrasonic device 611, a speaker 612, light sources 613, an emergency caller 614, and an alarm device 615.

In an example, the accelerometers 603 includes a three-axis accelerometer that is attached to the wearable device to detect a change in acceleration collected from X, Y, and Z axis data. The accelerometer data can be used by the item transportation application 622 to determine if there is an uneven surface or if there is a change in position corresponding to a slip, trip, or fall (STF) occurred. For a detected uneven surface, the user device 620 can send an indication to the wearable device indicating that the wearable device is to activate the alarm device 615 to indicate the uneven surface. The wearable device can then trigger the alarm device 615 to indicate the uneven surface. For an STF, the user device 620 can then send an indication to the wearable device indicating that the wearable device is to use the emergency caller 614 to initiate a call to receive assistance from emergency services. The emergency caller 614 may be implemented by the user device 620, so the user device 620 may perform the call for assistance. In addition, the wearable device may also send accurate incident log information via Bluetooth to a central dispatch system (e.g., computer system 130 in FIG. 1). In addition, the light sources 613 and/or the alarm device 615 may be triggered based on the accelerometer data. With the connected technology (e.g., GPS 610), the wearable device can use historical incident data to predict STFs based on geographic location and caution the delivery driver via the speaker 612 embedded in the wearable device.

In an example, the photosensor 604 can measure an amount of ambient light around the delivery driver and appropriately turn on the light sources 613 embedded in the wearable device to focus light on the walk path of the delivery driver. The light sources 613 may output light in different modes such as dim, bright, and strobe (e.g., for danger situations). Likewise, a reflector on the wearable device can light up automatically based on ambient light to help other people identify the delivery driver in the dark.

In an example, the proximity sensor 605 can monitor moving objects within a distance (e.g., twenty-five feet) of a delivery driver. The proximity sensor data can be received by the item transportation application 622, which can detect the moving objects. The user device 620 can indicate to the wearable device that the speaker 612 is to provide an alert and/or that the light sources 613 are to flash. The wearable device can then trigger the speaker 612 and/or the light sources 613 according to the indicated action.

In an example, the wearable device can use real-time environmental data from the GPS 610 and a weather service, and temperature data from a temperature sensor measuring a skin temperature of the delivery driver. The item transportation application 622 receive some or all the data and determine whether the delivery driver is at risk of an adverse incident (e.g., heat risk, slipping on wet or icy ground, etc.) based on an environmental condition (e.g., heat index, rainy weather, etc.) indicated by the environmental data. The user device 620 can indicate that the wearable device is to perform an action of audibly alerting the delivery driver via the speaker 612 about the environmental condition.

In an example, the camera 609 may generate image data and/or the sound sensor 606 may generate sound data that indicates a presence of an animal. The item transportation application 622 may process the image data and/or the sound data to determine the presence of the animal. For instance, the item transportation application 622 can use a computer vision model to detect the animal in the image data. The item transportation application 622 can use a different model to detect the animal in the sound data. The user device 620 can indicate to the wearable device that an alarm device, which may be the ultrasonic device 611 is to output ultrasonic sound waves. The wearable device can then trigger the ultrasonic device 611 according to the indicated action. In some instances, the ultrasonic device 611 may be triggered by a user input (e.g., a button push).

In an example, the ultrasonic device 611 can have or be coupled to one or more speakers and flashing light sources. The light sources may be disposed between the speakers. The ultrasonic device 611 can output ultrasonic noise and simultaneously turn the light sources on in the same direction at which the ultrasonic noise is emitted. That way, the animal will be targeted with both the ultrasonic noise and the light. As such, the ultrasonic noise and the light are emitted in the same direction and cover the same or similar spatial volume. In some instances, the speakers and the light sources may be separate devices, but the result of emitting ultrasonic noise and light in the same direction is the same. In both cases, the ultrasonic device 611 (and the light sources) can be disposed in the front of the wearable device.

In an example, the GPS 610 can generate geographical location data indicating an incorrect location for the item transportation. That is, the delivery driver may be attempting to delivery an item at a residential address for which no item is to be delivered. The item transportation application 622 may process the geographical location data to determine the incorrect location for the item transportation. The user device 620 can indicate to the wearable device that an output interface, such as the light sources 613, the speaker 612, or the alarm device 615 is to be triggered to indicate the incorrect location. The wearable device can then trigger the output interface according to the indicated action.

In an example, the sensor modules 601 can also include a microphone that generates data including speech input. The speech input can indicate a request for assistance. The item transportation application 622 may process the data to the request for assistance The item transportation application 622 can then initiate a call for assistance based on the speech input.

In an example, one or more of the sensor modules 601 may be on the user device 620. For instance, the accelerometers 603, camera 609, the GPS 610, or any of the other sensor modules 601 may be part of the user device 620. The item transportation application 622 can still process data generated by these sensor modules and cause an action at one or more of the output interfaces 602. In addition, the user device 620 may also control the wearable device from data other than the data received from the wearable device. This data can be from the user device 620, such as its GPS location, speed, etc. or from a server. For example, the server can tell the item transportation application 622 on the user device 620 that the delivery driver has a delivery at this location. Only when the user device 620 detects that it has arrived at the location will the user device 620 enable the wearable device to become smart (e.g., to then control the light sources ON and OFF based on proximity). Otherwise, the wearable device can be in a standby mode.

Figure 7:
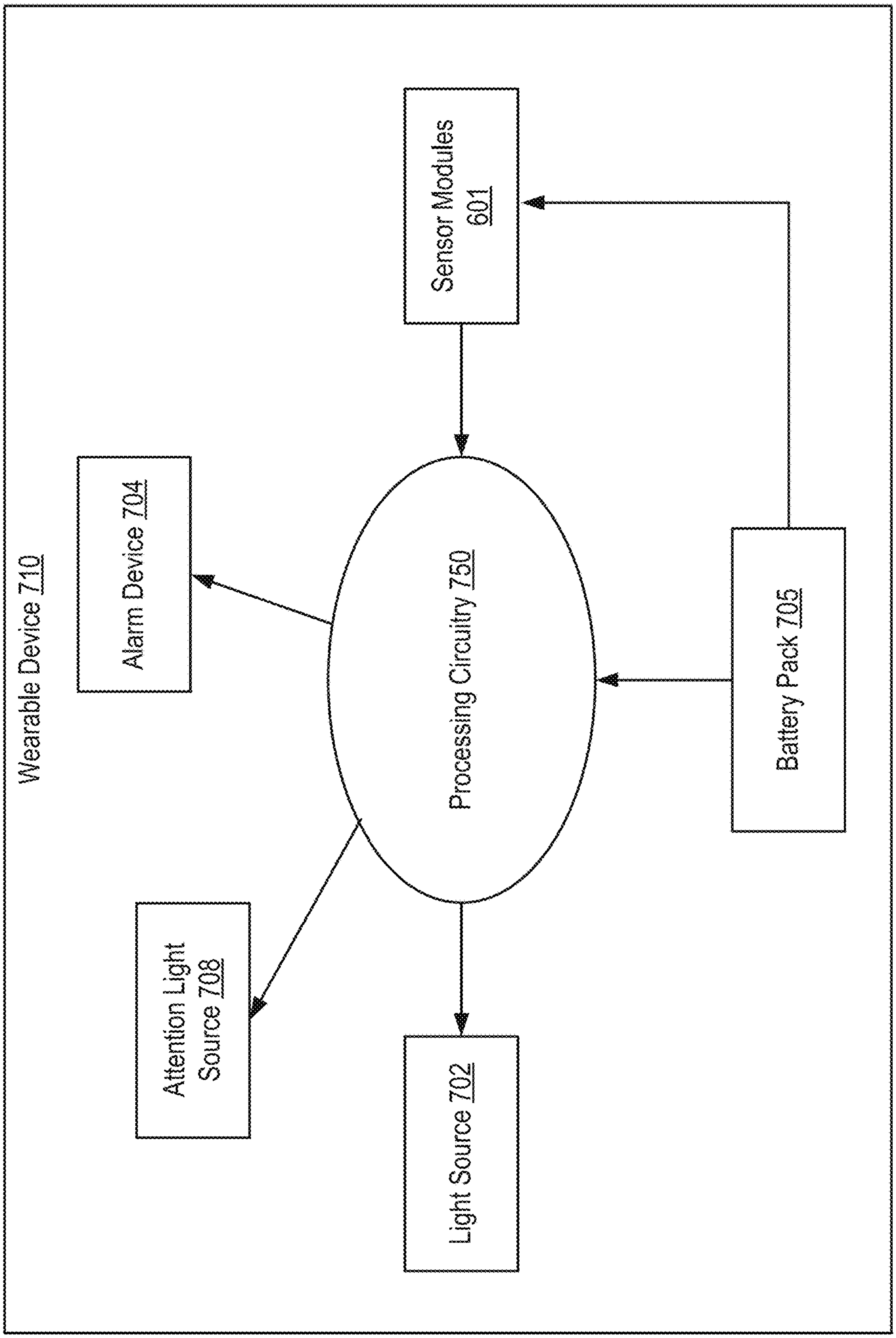
FIG. 7 illustrates an example of connection of components of a wearable device, according to some embodiments of the present disclosure.

FIG. 7 illustrates an example of connection of components of a wearable device 710, according to some embodiments of the present disclosure. The wearable device 710 can include processing circuitry 750, a battery pack 705, a light source 702, an attention light source 708, an alarm device 704, and sensor modules 601. The battery pack 705 can provide power to the processing circuitry 750 and the sensor modules 601. The sensor modules 601 include the modules illustrated in FIG. 6. Any of the data processing described in FIG. 6 with respect to the user device may be performed locally by the wearable device 710. That is, all of the sensor data shown in FIG. 6 can be processed locally by the processing circuitry 750 of the wearable device 710 for the same type of controls that the user device provides. The light source 702 may include one or more lights for providing illumination for a delivery driver. The attention light source 708 may reflect ambient light and/or may include a light source that outputs light at a lower illumination than the light source 702 to provide visibility of the delivery driver to others. For instance, the attention light source 708 may be associated with a logo for an entity with which the delivery driver is associated. The alarm device 704 may be a buzzer, ultrasonic device, speaker, etc. for providing alerts to detected threats for a delivery driver.

The electrical components may be integrated with each other using magnetic pogo pin connectors, silicone overmolding, or wedgelock ingress protection (IP) connectors. For magnetic pogo pin connectors, the plugs and the sockets of the pogo connector pairs rely on a magnetic force to make and maintain a connection. Silicone overmolding merges connectors and wires with injection and insert molding. The wedgelock IP connector can come with a thermoplastic connection.

The wearable device 710 may be operable in different modes. In a manual mode, a light button can be pressed to manually toggle on and off the light source 702 and the attention light source 708. When in manual mode, the light button can be pressed for a period of time (e.g., three seconds) to enter auto mode. The system can also turn into auto mode when there is not enough ambient light. When the proximity sensor 761 senses an object within a distance (e.g., eighteen inches), the light source 702 can turn off.

Figure 8:
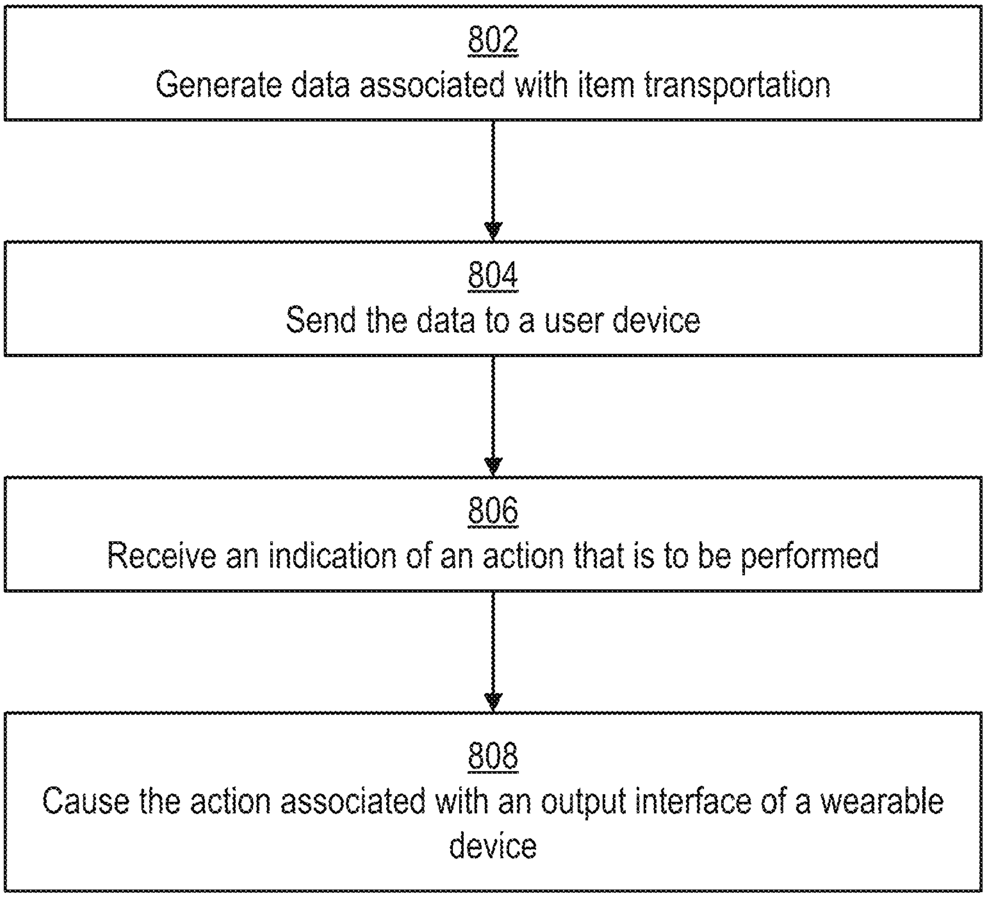
FIG. 8 illustrates an example of flow for item transportation alerts using a wearable device, according to embodiments of the present disclosure.

FIG. 8 illustrates an example of flow for item transportation alerts using a wearable device, according to embodiments of the present disclosure. Some or all of the instructions for performing the operations can be implemented as hardware circuitry and/or stored as computer-readable instructions on a non-transitory computer-readable medium of a wearable device (e.g., wearable device 110 in FIG. 1). As implemented, the instructions represent modules that include circuitry or code executable by processor(s) of the wearable device. The use of such instructions configures the wearable device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 802, where the wearable device generates data associated with item transportation. The wearable device includes an output interface that includes at least one of a light source or an alarm device. The wearable device also includes one or more sensors that generate the data.

In an example, the flow includes operation 804, where the wearable device sends the data to a user device. The user device is configured to execute an item transportation application. The user device can be associated with the delivery driver to perform operations in association with the item transportation.

In an example, the flow includes operation 806, where the wearable device receives an indication of an action that is to be performed. The indication of the action is received from the user device based on execution of the item transportation application. The action can involve generating an alert using the output interface based on the data.

In an example, the flow includes operation 808, where the wearable device causes the action associated with an output interface of the wearable device. For instance, the wearable device may cause the light source to turn on or flash, or may cause the alarm device to output an auditory alert.

Figure 9:
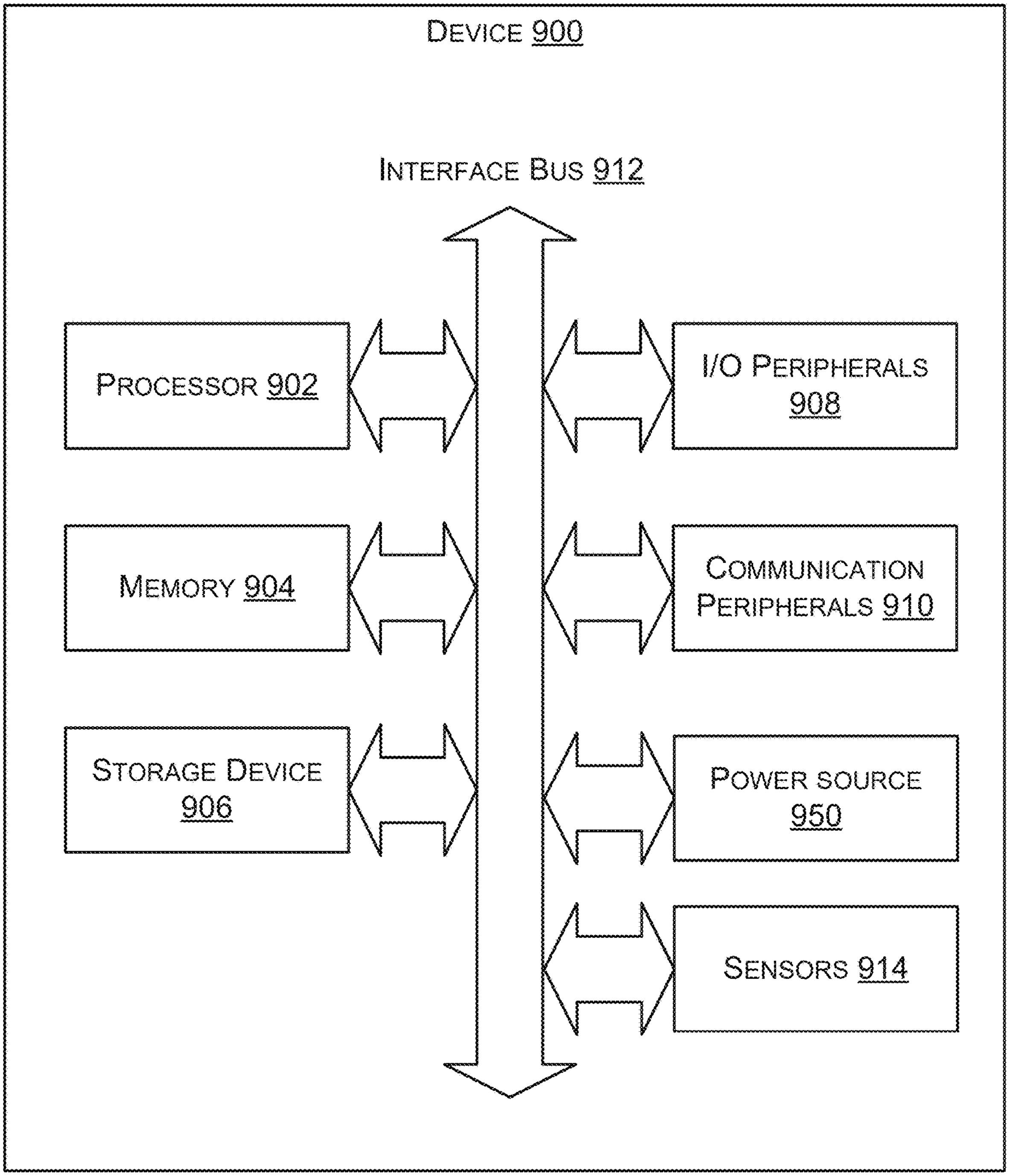
FIG. 9 illustrates aspects of an example environment for implementing aspects in accordance with various embodiments.

FIG. 9 illustrates example components of a device 900 that can be wirelessly charged, in accordance with embodiments of the present disclosure. The device 900 is an example of devices described herein above, including the wearable device 110 of FIG. 1. Although the components of the device 900 are illustrated as belonging to a same device 900, the components can be distributed between multiple devices, where these devices may be coupled (e.g., at least communicatively).

The device includes a power source 950 that can supply power to other components of the device 900. The power source 950 can include a battery that can be recharged wireless. The other components can include at least a processor 902, a memory 904, a storage device 906, input/output peripherals (I/O) 908, communication peripherals 910, an interface bus 912, and sensors 914. At least one of such components (e.g., the processor 902) can be an electrical load in a branch that is electrically connected in parallel to the receiver side. The interface bus 912 is configured to communicate, transmit, and transfer data, controls, and commands among the various components of the device 900. The memory 904 and the storage device 906 include computer-readable storage media, such as RAM; ROM; electrically erasable programmable read-only memory (EEPROM); hard drives; CD-ROMs; optical storage devices; magnetic storage devices; electronic non-volatile computer storage, for example, Flash® memory; and other tangible storage media. Any of such computer readable storage media can be configured to store instructions or program codes embodying aspects of the disclosure. The memory 904 and the storage device 906 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the device 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computer system of, for example, a cloud network or a data center. The I/O peripherals 908 include user interfaces, such as a light source; an alarm device; a keyboard; screen (e.g., a touch screen); microphone; speaker; other input/output devices; and computing components, such as graphical processing units; serial ports; parallel ports; universal serial buses; and other input/output peripherals. The I/O peripherals 908 are connected to the processor 902 through any of the ports coupled to the interface bus 912. The sensors 914 include any of the sensors described herein such as accelerometers; cameras; microphones; proximity sensors; photosensors; etc. The sensors 914 are connected to the processor 902 through any of the ports coupled to the interface bus 912. The communication peripherals 910 are configured to facilitate communication between the device 900 and other systems over a communications network and include, for example, a network interface controller, modem, wireless and wired interface cards, antenna, and other communication peripherals.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A wearable garment comprising:

a front portion configured to be disposed around a front of a body of a delivery driver;

a back portion configured to be disposed around a back of the body;

a shoulder portion disposed between the front portion and the back portion and configured to be disposed around a shoulder of the body;

a first light source disposed in the front portion and configured to output first light at a first range from the body;

a second light source disposed in the front portion and configured to output second light at a second range from the body, wherein the second range is different from the first range;

a first proximity sensor disposed in the shoulder portion with a sensing direction that (i) is upwards from the shoulder portion in an upwards direction from the shoulder or (ii) is backwards from the back portion in a rearward direction from the back, the first proximity sensor configured to generate first sensor data indicating a first detection of a first surface above or behind the delivery driver;

processing circuitry disposed in the front portion, the processing circuitry communicatively coupled to the first light source, the second light source, and the first proximity sensor and configured to control the first light source and the second light source based at least in part on the first sensor data such that the first light source and the second light source are deactivated upon the first detection of the first surface; and a battery pack disposed in the back portion and electrically coupled to the processing circuitry for providing power to the processing circuitry.

2. The wearable garment of claim 1, further comprising:

a second proximity sensor disposed in the front portion and configured to generate second sensor data indicating a second detection of a second surface relative to the second proximity sensor.

3. The wearable garment of claim 1, further comprising:

a housing for the first light source and the second light source, wherein the housing includes a hinge for adjusting an angle of the first light and the second light.

4. The wearable garment of claim 3, wherein the front portion comprises a first shoulder portion and a second shoulder portion, and wherein the housing, the first proximity sensor, and the processing circuitry are disposed in the first shoulder portion.

5. A system comprising:

a wearable garment configured to generate data associated with item transportation, the wearable garment including an output interface, the output interface including at least one of a light source or an alarm device; and a user device configured to execute an item transportation application, wherein upon execution of the item transportation application the user device is configured to:

receive the data from the wearable garment; and cause, based at least in part on the data, an action associated with the output interface of the wearable garment.

6. The system of claim 5, wherein the light source comprises a first light source configured to output first light at a first range, and wherein the wearable garment further comprises:

a second light source configured to output second light at a second range, wherein the second range is different from the first range;

a proximity sensor configured to generate sensor data indicating a detection of a surface relative to the proximity sensor;

processing circuitry communicatively coupled to the first light source, the second light source, and the proximity sensor and configured to control the first light source and the second light source based at least in part on the sensor data; and a battery pack electrically coupled to the processing circuitry for providing power to the processing circuitry.

7. The system of claim 5, wherein the data includes a speed indicating that the wearable garment is moving with a transportation resource, and wherein the action comprises disabling the light source from outputting light.

8. The system of claim 5, wherein the data includes accelerometer data indicating an uneven surface, and wherein the action comprises triggering the alarm device to indicate the uneven surface.

9. The system of claim 5, wherein the data includes geographical location data indicating an incorrect location for the item transportation, and wherein the action comprises triggering the output interface to indicate the incorrect location.

10. The system of claim 5, wherein the data includes image data or sound data indicating a presence of an animal, and wherein the action comprises triggering the alarm device to output ultrasonic sound waves based at least in part on a user input or the data.

11. The system of claim 5, wherein the data includes environmental data indicating an environmental condition associated with the item transportation, and wherein the action comprises triggering the output interface to indicate the environmental condition.

12. The system of claim 5, wherein the wearable garment further comprises:

processing circuitry configured to control the output interface based at least in part on the data; and a battery pack electrically coupled to the processing circuitry for providing power to the processing circuitry, and wherein the processing circuitry and the battery pack are disposed in a removable sleeve that is removably coupled to a wearable item.

13. A method comprising:

generating, by a wearable garment, data associated with item transportation, the wearable garment including an output interface, the output interface including at least one of a light source or an alarm device;

sending the data to a user device configured to execute an item transportation application;

receiving, from the user device based at least in part on execution of the item transportation application, an indication of an action that is to be performed; and causing, based at least in part on the data, the action associated with the output interface of the wearable garment.

14. The method of claim 13, wherein the data includes speech input indicating a request for assistance, and wherein the item transportation application is configured to initiate a call for the assistance at the user device based at least in part on the speech input.

15. The method of claim 13, further comprising:

receiving a user input associated with a button communicatively coupled to the alarm device; and causing an activation of the alarm device based at least in part on the user input.

16. The method of claim 13, wherein the data includes accelerometer data indicating a change in position, and wherein the action comprises triggering the output interface based at least in part on the change in position.

17. The method of claim 13, wherein the wearable garment further includes a proximity sensor configured to generate sensor data indicating a detection of a surface relative to the proximity sensor.

18. The method of claim 13, wherein the action comprises outputting ultrasonic noise and light in a same direction and in a same spatial volume.

19. The method of claim 13, wherein the wearable garment comprises a front portion and a back portion, wherein the light source, a proximity sensor, and processing circuitry are disposed in the front portion and a battery pack is disposed in the back portion.

20. The method of claim 13, wherein the data includes image data or sound data indicating a presence of an animal, and wherein the action comprises triggering the alarm device to output ultrasonic sound waves.

* * * * *